United States Patent
Yamada et al.

(10) Patent No.: US 7,095,927 B2
(45) Date of Patent: Aug. 22, 2006

(54) OPTICAL DISTRIBUTOR AND OPTICAL DISTRIBUTING SYSTEM

(75) Inventors: Hidenori Yamada, Kanagawa (JP); Junji Okada, Kanagawa (JP); Osamu Ueno, Kanagawa (JP); Shinya Kyozuka, Kanagawa (JP); Yoshihide Sato, Kanagawa (JP); Masaru Kijima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 8 days.

(21) Appl. No.: 10/395,148

(22) Filed: Mar. 25, 2003

(65) Prior Publication Data
US 2004/0067024 A1 Apr. 8, 2004

(30) Foreign Application Priority Data
Oct. 4, 2002 (JP) ............................. 2002-292883

(51) Int. Cl.
*G02B 6/26* (2006.01)
(52) U.S. Cl. ................ 385/48; 385/24; 385/31
(58) Field of Classification Search .............. 385/24, 385/31, 48
See application file for complete search history.

(56) References Cited

U.S. PATENT DOCUMENTS

| | | | |
|---|---|---|---|
| 5,822,475 A | | 10/1998 | Hirota et al. |
| 6,324,317 B1 * | | 11/2001 | Tanaka et al. ............ 385/24 |
| 6,532,320 B1 * | | 3/2003 | Kikuchi et al. ........... 385/24 |
| 6,567,581 B1 * | | 5/2003 | Cao ........................ 385/24 |
| 6,665,460 B1 * | | 12/2003 | Derventzis et al. ....... 385/16 |

FOREIGN PATENT DOCUMENTS

| | | |
|---|---|---|
| JP | A 62-14538 | 1/1987 |
| JP | A 63-1223 | 1/1988 |
| JP | A 1-222533 | 9/1989 |
| JP | A 10-123350 | 5/1998 |
| JP | A 2001-166177 | 6/2001 |

OTHER PUBLICATIONS

Auracher et al., "Optimized layout for a data bus system based on a new planar access coupler", Applied Optics, vol. 16, No. 12, Dec. 1977.
Hudson et al., "The Star Coupler: A Unique Interconnection Component for Multimode Optical Waveguide Communications Systems", Applied Optics, vol. 13, No. 11, Nov. 1974.
Takanashi et al, "High-Uniformity Star Coupler Using Diffused Light Transmission", IEICE Transactions on Electronics, vol. E84-C, No. 3, Mar. 2001.

* cited by examiner

*Primary Examiner*—Nikita Wells
*Assistant Examiner*—Paul M. Gurzo
(74) *Attorney, Agent, or Firm*—Oliff & Berridge, PLC.

(57) ABSTRACT

An optical distributor includes an optical-signal input port, a light receiving device, a light emitting device, a light splitter, and optical signal output ports. The light receiving device converts an optical light signal input to the optical-signal input port into an electric signal. The light emitting device converts the electric signal into an optical signal. The optical splitter 14 splits the converted optical signal into two optical signals. The optical-signal output ports output the split optical signals. The light receiving device includes a light receiving element, a pre-amplifier, and a limiting amplifier. The light emitting device includes a light-source drive element and a light emitting element.

16 Claims, 6 Drawing Sheets

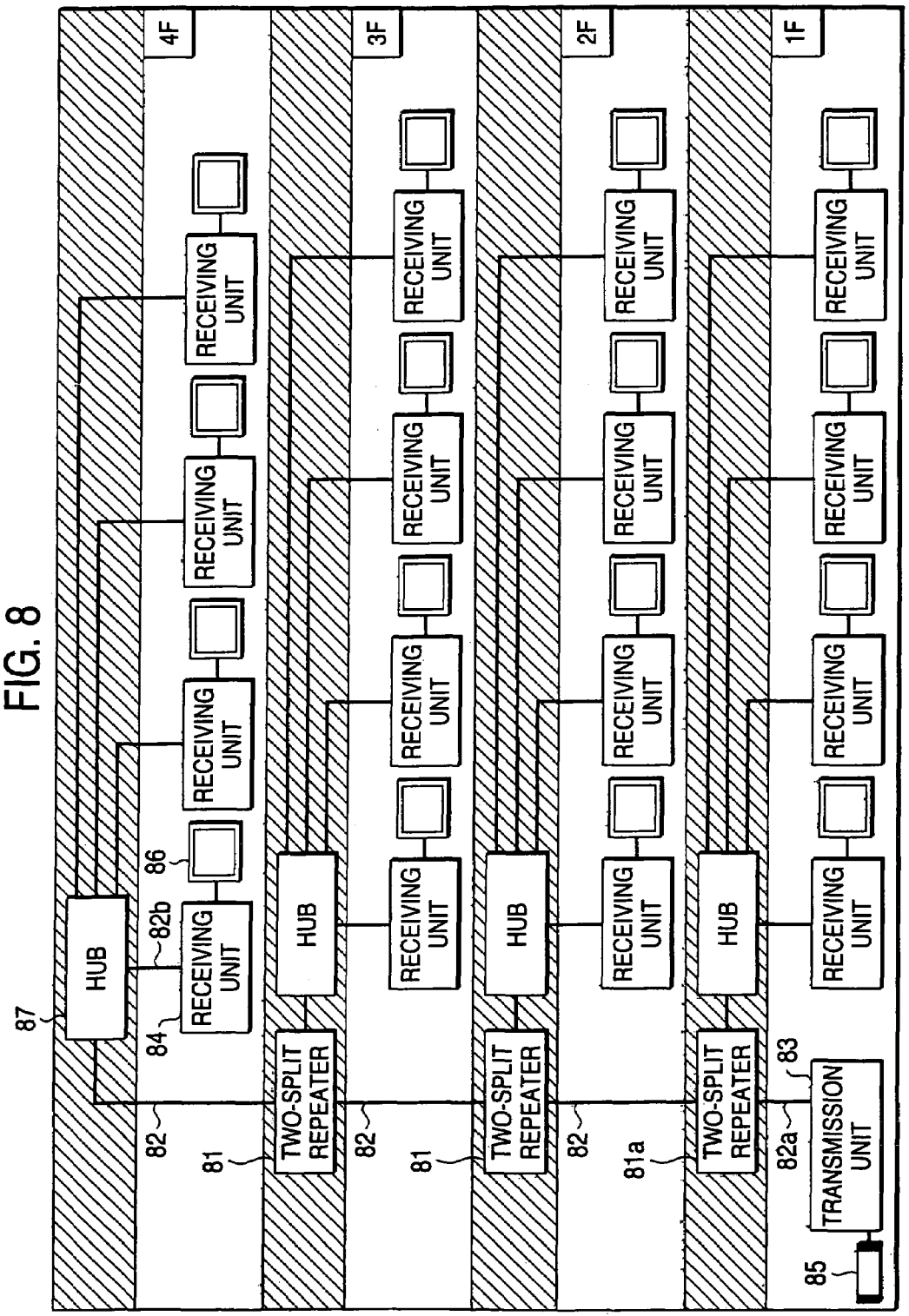

OPTICAL DISTRIBUTOR AND OPTICAL DISTRIBUTING SYSTEM

The present disclosure relates to the subject matter contained in Japanese Patent Application No. 2002-292883 filed on Oct. 4, 2002, which is incorporated herein by reference in its entirety.

BACKGROUND OF THE INVENTION

1. Field of the Invention

The present invention relates to an optical distributor for splitting an input optical signal and outputting the split optical signals, and an optical distributing system using the optical distributor.

2. Description of the Related Art

In an optical network system for transmitting an optical signal to a plurality of devices connected to optical fibers, optical splitters (optical distributors) each for splitting an optical signal and transmitting the split optical signals to the devices are disposed at respective positions. The optical signal is input to desired devices by way of the optical splitters. For the optical splitters of this type, the following optical splitters have been known.

<Literature 1>

F. Auracher and H.-H. Witte, "Optimized layout for a data bus system based on a new planar access coupler", APPLIED OPTICS, Vol. 16, Nos. 12, 3140–3142, December 1977

The literature 1 discloses a coupler for coupling and/or splitting an optical signal with respect to a trunk fiber (FIG. 1 of the literature 1). A connecting portion of the main fiber is shifted, and a splitting fiber is connected to the connecting portion. Thereby, the coupler is implemented.

<Literature 2>

Marshall C. Hudson and Frank L. Thiel, "The Star Coupler: A Unique Interconnection Component for Multimode Optical Waveguide Communications Systems", APPLIED OPTICS, Vol. 13, No. 11, 2540–2545, November 1974

The literature 2 discloses an optical coupler for coupling and/or splitting an optical signal with respect to a main fiber (FIG. 1 of the literature 2). In the literature 2, a multi-to-multi optical coupler such as a star coupler is used. An optical coupler of a reflection type may be used as another form of the optical coupler (FIG. 2 of the literature 2).

An optical data way terminal device is disclosed in JP-A-62-014538. In the terminal device, an optical signal from a single optical fiber transmission path, which is arranged to have a looped shape or a linear shape, is split at a splitting portion having a variable splitting ratio.

An optical bus system including an optical fiber line and an optical coupler is disclosed in JP-A-63-001223. A splitting ratio of the optical fiber is gradually increased from a start end of the optical fiber line so that the split destinations receive light beams having light levels substantially equal to each other.

A bus system optical network system is disclosed in JP-A-1-222533. The network system includes two optical fiber cables for trunk transmission line, which are interconnected at one ends to each other, and an optical two-splitting coupler for connecting an output signal from a communication control unit and an input signal to the communication control device to the two optical fiber cables, respectively.

An optical splitter and an optical network are disclosed in JP-A-2001-166177. The optical splitter includes a light-transmission medium having first and second end faces, and a light diffusion portion provided at the first end face. The optical splitter changes a splitting ratio of an optical signal at an output portion in a manner that a light intensity distribution at an end face of a light emitting side of the light-transmission medium is changed by varying any of a distance between the first and second end faces, light incident position, and light diffusion angle.

Meanwhile, in a system for transmitting an optical signal to a plurality of devices connected to an optical fiber, it is sometimes desired to distribute optical signals of desired levels to the devices. An example of such is a case where video information is transmitted from a video output device to a receiver in a room at each floor in a building such as a hotel. In a possible way to distribute video information from the video output device to each receiver, an optical transmitting unit of the video output device is connected to optical receiving units of the receivers by optical fibers, respectively. In this case, installed optical fibers equal in number to the receivers are required, resulting in increase of wiring cost. A possible way to cope therewith is that an optical coupler are installed at each floor, a light signal from the optical transmitting unit is sent to the optical couplers, and in turn the couplers each splits the optical signal and sends the split ones to the receivers. However, when the optical couplers split the optical signal, a signal level of the optical signal drops depending on the splitting number. Accordingly, it is impossible to send the optical signal of sufficient level to the light receiving unit of each receiver. This problem would arise not only in the above case, but also in a system for transmitting an optical signal to another device by way of the optical fiber.

SUMMARY OF THE INVENTION

An object of the present invention is to provide an optical distributor capable of adjusting an output signal level, and an optical distributing system using the same.

To achieve the above object, there is provided an optical distributor including at least one optical-signal input port, a light receiving device for converting a first optical signal input to the optical-signal input port into an electric signal, a light emitting device for converting the electric signal into a second optical signal, an optical splitter for splitting the second optical signal into a plurality of third optical signals, and a plurality of optical-signal output ports for outputting the third optical signals. To achieve the above object, there is also provided An optical splitter including at least one optical-signal input port, a light amplifier for amplifying a first optical signal input to the optical-signal input port, an optical splitter for splitting the amplified first optical signal into a plurality of second optical signals, and a plurality of optical-signal output ports for outputting the second optical signals.

The optical splitter may include a light-transmission medium having an incident portion provided at one end thereof, and an output portion provided at the other end thereof. An optical signal incident on the incident portion is transmitted with spreading over the output portion. Alternatively, the optical splitter may include a light-transmission medium having an incident portion provided at one end thereof, and a plurality of output portions formed at stepped portions formed at the other ends thereof. An optical signal incident on the incident portion is output from the plurality of output portions. In this case, a light diffusion portion for diffusing light may be provided at the incident portion of the light-transmission medium. This light diffusion portion is a portion for diffusing light by the entire interior of the light-transmission medium. Opal glass, for example, may be used for the light diffusion portion. A light diffusion portion for diffusing light may be provided at the incident portion of the light-transmission medium.

The optical splitter may include a light-transmission medium having an incident portion provided at one end thereof, a light reflection portion provided at the other end thereof, and an output portion provided at the one end. An optical signal incident on the light incident portion is reflected at the light reflection portion and transmitted with spreading over the output portion. In addition, a light diffusion portion may be provided in the light-transmission medium and may diffuse the light incident to the incident portion.

Also, the optical splitter may include a light-transmission medium having an incident portion provided at one end thereof, a light reflection/diffusion portion provided at the other end thereof, and an output portion provided at the one end. An optical signal incident on the light incident portion is reflected and diffused at the light reflection/diffusion portion and transmitted with spreading over the output portion. Alternatively, the optical splitter may include a light-transmission medium having an incident portion formed at least one of stepped portions having step shapes formed at one end thereof, a light reflection portion provided at the other end thereof, and output portions formed at the plural stepped portions. An optical signal incident on the incident portion is reflected at the light reflection portion and is output form the output portions.

In addition, a light diffusion portion may be provided in the light-transmission medium and may diffuse the light incident to the incident portion. Alternatively, the optical splitter may include a light-transmission medium having an incident portion formed at least one of stepped portions having step shapes formed at one end thereof, a light reflection/diffusion portion provided at the other end thereof, and output portions formed at the plural stepped portions. An optical signal incident on the incident portion is reflected and diffused at the light reflection/diffusion portion and is output form the output portions.

Also, at least one of the optical-signal input port and the optical-signal output ports may include a connector for optical fiber connection.

An optical distributing system according to the invention, includes an optical distributing group in which a plurality of optical distributors as described above are connected in series, a transmission unit for transmitting an optical signal to the optical distributor located at the most upstream in the optical distributor group, and at least one receiving unit for receiving the optical signal from at least one of the optical distributors, respectively. Here, the optical-signal output ports may be two optical-signal output ports. Alternatively, the optical distributors may be a plurality of first optical distributors each having one optical-signal input port and two optical-signal output ports, and at least one second optical splitter having one optical-signal input port and at least three optical-signal output ports. The receiving unit receives the optical signal from the second optical splitter. The optical signal transmitted from the transmission unit may include video information.

With construction as described above, an output level of the split optical signal can be adjusted (containing amplification). Therefore, in a system for transmitting an optical signal to a plurality of devices connected through optical fibers, an optical signal of desired level can be distributed to each of devices.

BRIEF DESCRIPTION OF THE DRAWINGS

FIG. 8 is a diagram showing another embodiment of an optical distributing system according to the invention.

DETAILED DESCRIPTION OF THE PREFERRED EMBODIMENTS

Figure 1:
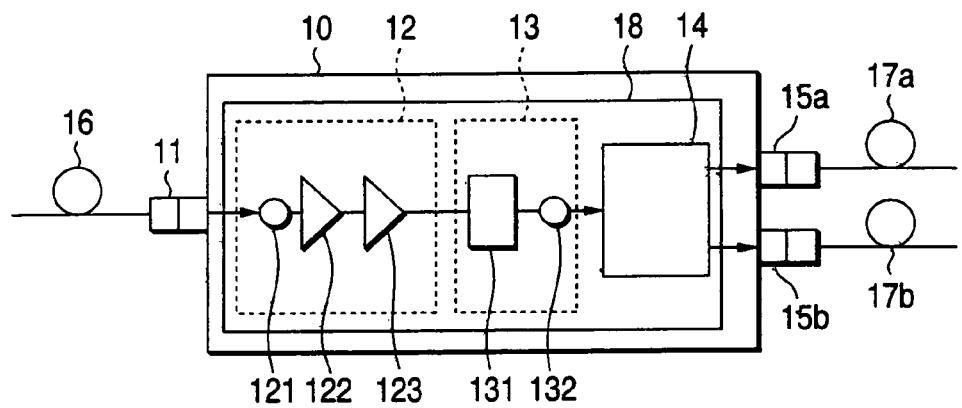
FIG. 1 is a diagram showing an optical splitter according to an embodiment of the invention.

FIG. 1 is a diagram showing an optical distributor according to an embodiment of the invention. As shown in the figure, an optical distributor 10 includes an optical-signal input port 11, a light receiving device 12, a light emitting device 13, a light splitting device 14 and light-signal output ports 15a, 15b. The light receiving device 12 converts an optical light signal input to the optical-signal input port into an electric signal. The light emitting device 13 converts the electric signal into an optical signal. The optical splitter 14 splits the converted optical signal into two optical signals. The two optical-signal output ports 15a and 15b output the split two optical signals, respectively. The optical-signal input port 11 has a connector for connection to an optical fiber 16. The optical-signal output ports 15a and 15b have connectors for connection to optical fibers 17a an 17b, respectively. The light receiving device 12 includes a light receiving element 121 such as a photo diode, a pre-amplifier 122 and a limiting amplifier 123. The light emitting device 13 includes a light-source drive element 131 such as a laser diode driver, and a light emitting element 132 such as a laser diode. A specific example of the optical splitter 14 will now be described later in detail. In this embodiment, the light receiving device 12, the light emitting device 13 and the optical splitter 14 are mounted on a module board 18.

The optical distributor 10 operates in the following way. An optical signal is input to the optical-signal input port 11 through the optical fiber 16, and the light receiving element 121 receives the optical signal and converts it into an electric signal. A pre-amplifier 122 amplifies the electric signal, and a limiting amplifier 123 amplifies, binarizes and waveform-shapes the electric signal. A light-source drive element 131 drives a light emitting element 132 based on the electric signal. The light emitting element 132 outputs an optical signal, which is formed by adjusting the input optical signal. For example, the light emitting element 132 can adjust (amplify) the optical signal having a power level of 10 µW to 50 µW, which is input to the light receiving element 121, to a power level of 0.5 mW to 12 mW. The optical splitter 14 splits the optical signal emitted from the light emitting element 132 into two optical signals. Those optical signals are output to optical fibers 17a an 17b via the optical-signal output ports 15a and 15b, respectively. In the embodiment, the optical distributor 10 has one input port and two output ports (splitting number). However, the invention is not limited to this embodiment and the optical distributor may have one or more input ports, and two or more output ports.

Figure 2:
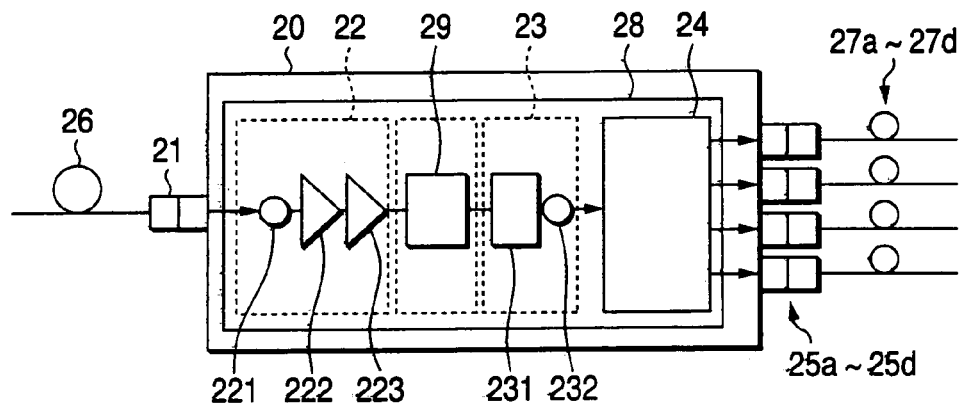
FIG. 2 is a diagram showing another embodiment of an optical splitter according to the present invention.

FIG. 2 is a diagram showing an optical distributor according to another embodiment of the invention. As shown in the figure, an optical distributor 20 includes an optical-signal input port 21, a light receiving device 22, a waveform shaping device 29, a light emitting device 23, a light splitter 24, and four optical-signal output ports 25a to 25d. The light receiving device 22 converts an optical signal, which is input to the optical-signal input port 21, into an electric signal. The waveform shaping device 29 shapes a waveform of the electric signal. The light emitting device 23 converts the electric signal into an optical signal. The optical splitter 24 splits the converted optical signal into four optical signals. The four optical-signal output ports 25a to 25d output those split optical signals, respectively. The optical-signal input port 21 has a connector for connection to an optical fiber 26. The optical-signal output ports 25a to 25d have connectors for connection to optical fibers 27a to 27d, respectively. The light receiving device 22 includes a light receiving element 221 such as a photo diode, a pre-amplifier 222, and an post-amplifier 223. The light emitting device 23 includes a light-source drive element 231 such as a laser diode driver, and a light emitting element 232 such as a laser diode. A specific example of the optical splitter 24 will be described later. In the embodiment, the light receiving device 22, the waveform shaping device 29, the light emitting device 23 and the optical splitter 24 are mounted on a module board 28.

The optical distributor 20 operates in the following way. An optical signal is input to the optical-signal input port 21 through the optical fiber 26. The light receiving element 221 receives this optical signal and converts it into an electric signal. The pre-amplifier 222 amplifies the electric signal. Then, the post-amplifier 223 further amplifies the electric signal. The waveform shaping device 29 performs clock retiming and waveform shaping with respect to the electric signal. In this case, the waveform shaping binarizes the electric signal and adjusts the duty cycle of the electric signal. The light-source drive element 231 drives the light emitting element 232 on the basis of the electric signal. The light emitting element 232 produces an optical signal, which results from the adjusting (amplifying) of the input optical signal. The optical splitter 24 splits the optical signal emitted from the light emitting element 232 into four optical signals. Those optical signals are output to the optical fibers 27a to 27d via the optical-signal output ports 25a to 25d. In the embodiment, the optical distributor 20 has one input port and four output ports (splitting number). However, numbers of the input ports and output ports are not limited to this embodiment.

Figure 3:
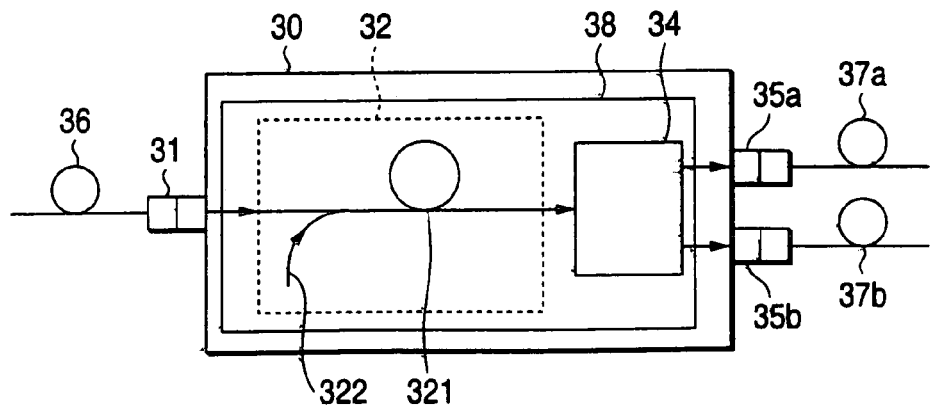
FIG. 3 is a diagram showing still another embodiment of an optical splitter according to the present invention.

FIG. 3 is a diagram showing an optical distributor according to still another embodiment of the invention. While in each of the two embodiments described above, an input optical signal is converted into an electric signal and the converted electric signal is further converted into an optical signal, an optical signal is directly amplified and output in this embodiment. As shown in the figure, an optical distributor 30 includes an optical-signal input port 31, an optical amplifier 32, an optical splitter 34, and two optical-signal output ports 35a, 35b. The optical amplifier directly amplifies an optical signal input to the optical-signal input port 31. The optical splitter 34 splits the amplified optical signal into two optical signals. The two optical-signal output ports 35a and 35b output the split optical signals, respectively. The optical-signal input port 31 has a connector for connection to an optical fiber 36. The optical-signal output ports 35a and 35b have connectors for connection to optical fibers 37a and 37b, respectively. The optical amplifier 32 includes an erbium-doped optical fiber 321 and a pumping light transmission optical fiber 322. A specific example of the optical splitter 34 will be described later. In the embodiment, the optical amplifier 32 and the optical splitter 34 are mounted on a module board 38.

The optical distributor 30 operates in the following way. Firstly, an optical signal is input to the erbium-doped optical fiber 321 through the optical fiber 36 and the optical-signal input port 31. Then, in the erbium-doped optical fiber 321, the optical signal is optically amplified by the stimulated emission in a state that the input optical signal is pumped by pumping light transmitted from a pumping light transmission optical fiber 322. The optical splitter 34 splits the amplified optical signal into two optical signals. Those split optical signals are output to the optical fibers 37a and 37b via the optical-signal output ports 35a and 35b, respectively. In the embodiment, the erbium-doped optical fiber is used for the optical amplifier 32. However, the invention is not limited to the erbium-doped optical fiber. Any other suitable amplifier may be used for the optical amplifier. Also, a semiconductor optical amplifier such as a resonance type optical amplifier using a semiconductor laser may be used. In the embodiment, the optical distributor 30 has one input port and two output ports (splitting number). However, numbers of the input ports and output ports are not limited to the above numbers.

Figure 4A:
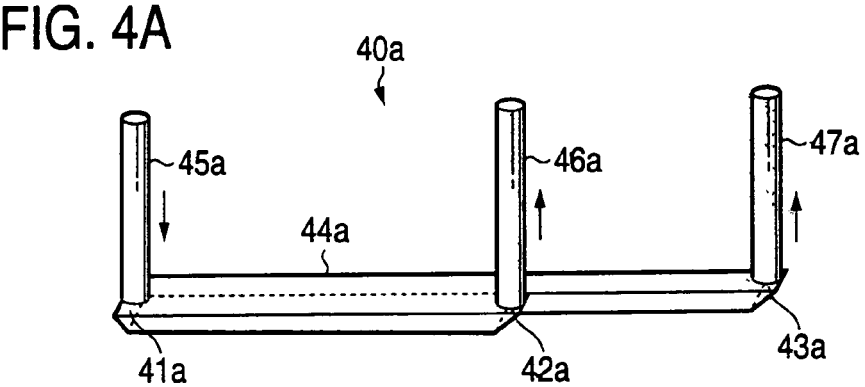
FIGS. 4A to 4D are diagrams showing optical splitters used in the invention.
Figure 4B:
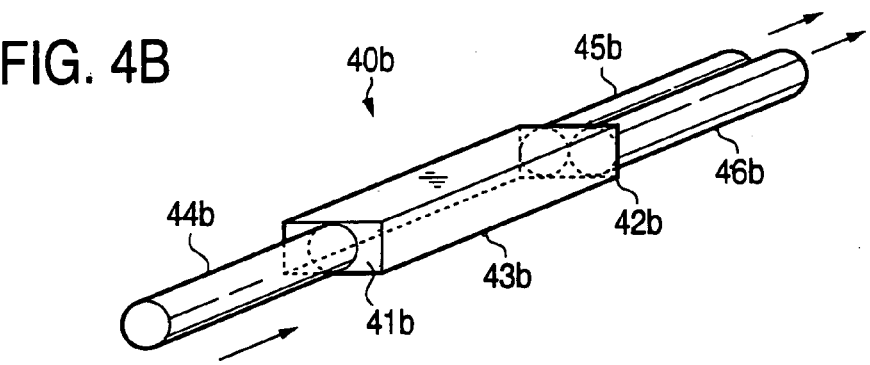
Figure 4C:
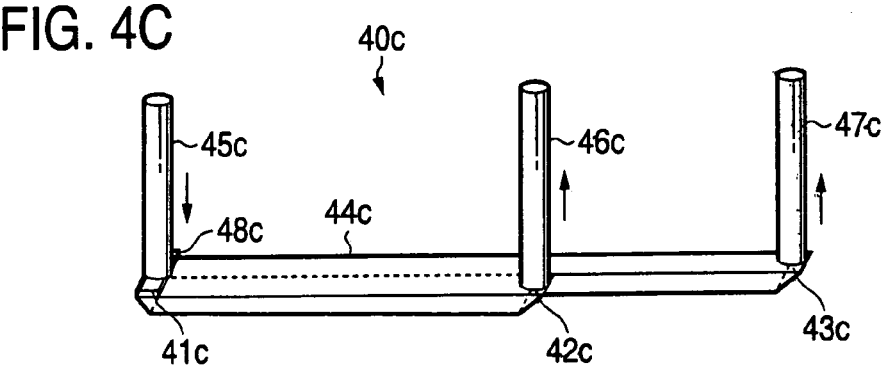
Figure 4D:
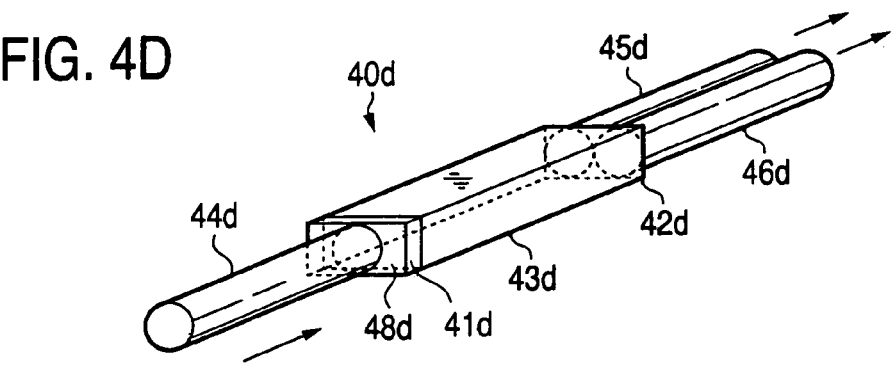
Figure 5A:
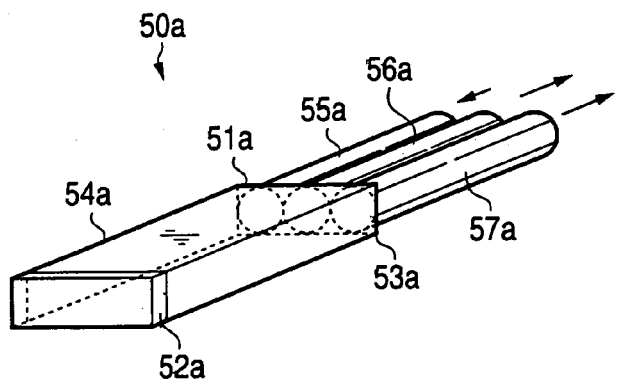
FIGS. 5A to 5D are diagrams showing details of optical splitters used in the invention.
Figure 5B:
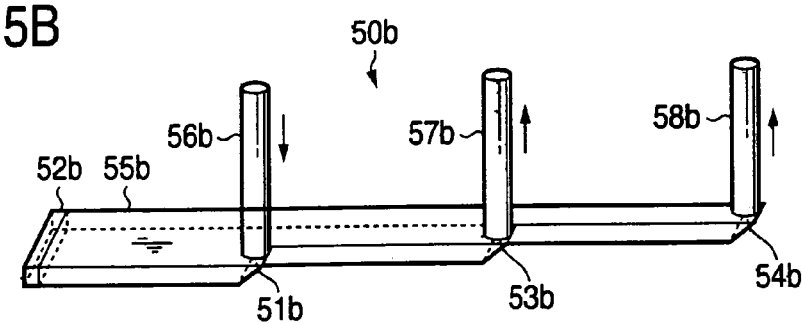
Figure 5C:
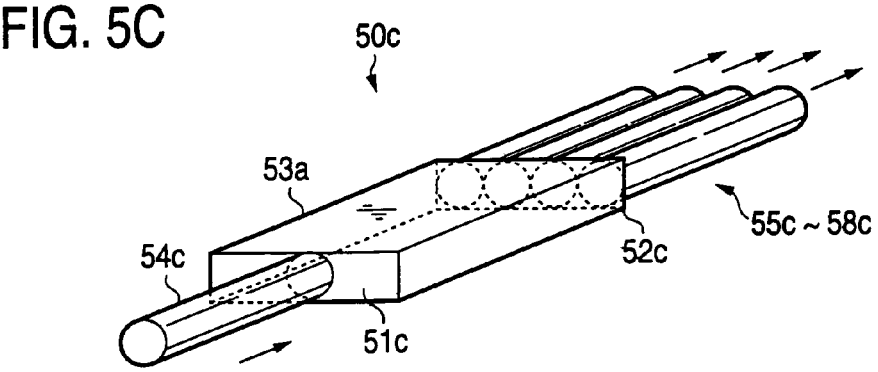
Figure 5D:
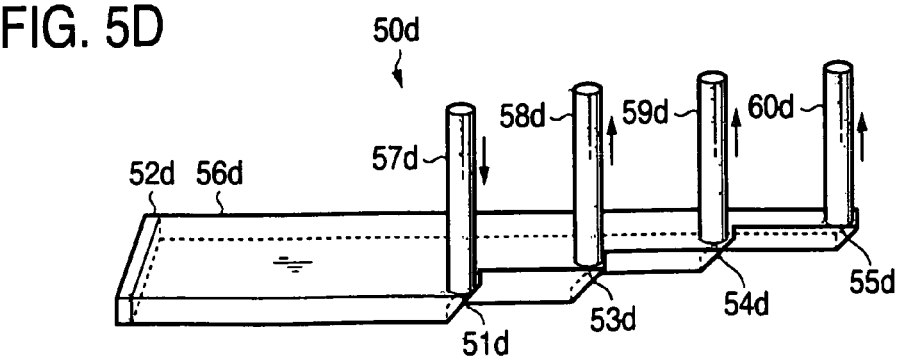

FIGS. 4A to 4D and FIGS. 5A to 5D show specific examples of an optical splitter used in the invention. FIGS. 4A and 4B show an optical splitter, which is of the two-splitting type and does not have a diffusion portion. FIGS. 4C and 4D show an optical slitter which, is of the two-splitting type and has a diffusion portion. FIGS. 5A and 5B show an optical splitter, which is of the two-splitting type and of the reflection type. FIG. 5C shows an optical splitter, which is of the four-splitting type and of the transmission type. FIG. 5D shows an optical splitter, which is of the three-splitting type and of the reflection type.

The diffusion portion may be realized by diffusing optical scattering materials into a light-transmission medium as shown in FIG. 6 of JP-A-10-123350 (U.S. Pat. No. 5,822,475).

An optical splitter 40a shown in FIG. 4A includes a light-transmission medium 44a having a light incident portion 41a provided at one end thereof and two light output portions 42a and 43a, which have stepped shapes, at other ends thereof. An optical signal is incident on the light incident portion 41a and output from the light output portions 42a and 43a. An optical signal, which is emitted or output from the light emitting element or optical amplifier of the optical distributor, is directly incident on the light incident portion 41a via an optical fiber 45a. The incident optical signal is introduced through a 45°-surface formed at the light incident portion 41a into the light-transmission medium 44a, and is transmitted toward the stepped portions provided at the other ends while the incident optical signal is repeating reflection. The optical signal is then transmitted to optical fibers 46a and 47a by way of 45°-surfaces formed at the light output portions 42a and 43a.

An optical splitter 40b shown in FIG. 4B includes a light-transmission medium 43b having a light incident portion 41b provided at one end thereof and a light output portion 42b provided the other end thereof. An optical signal is incident on the light incident portion 41b, is transmitted with spreading over the light output portion 42b, and is output from almost the whole part of the light output portion 42b. An optical signal is incident on the light incident portion 41b through an optical fiber 44b or directly from a light emitting element or the optical amplifier of the optical distributor. The incident optical signal is transmitted toward the light output portion 42b provided at the other end thereof while being reflected at the inner surface of the light-transmission medium 43b. The optical signal is split and transmitted to two optical fibers 45b and 46b via the light output portion 42b.

An optical splitter 40c shown in FIG. 4C has substantially the same construction as that of the optical splitter 40a shown in FIG. 4A, except that the optical splitter 40c includes a light diffusion portion 48c. In this case, an optical signal, which is incident on the optical splitter 40c through an optical fiber 45c, is diffused by the light diffusion portion 48c provided at a light incident portion 41c. The diffused light is led into a light-transmission medium 44c by way of a 45°-surface formed at the light incident portion 41c, and is transmitted in a direction of stepped portions having stepped shape at the other ends thereof, while the diffused light is being reflected at the inner surface of a light-transmission medium 44c. The optical signal is split and transmitted to optical fibers 46c an 47c by way of 45°-surfaces formed at light output portions 42c and 43c. With provision of the light diffusion portion 48c, the optical signal transmitted to the two optical fibers 46c and 47c is improved in uniformity.

An optical splitter 40d shown in FIG. 4D has substantially the same construction as that of the optical splitter 40b shown in FIG. 4B, except that the optical splitter 40d includes a light diffusion portion 48d. In this case, an optical signal, which is incident on the optical splitter 40d through an optical fiber 44d, is diffused by the light diffusion portion 48d provided at a light incident portion 41d. The diffused light is transmitted toward a light output portion 42d provided at the other ends of the optical splitter 40d, while the diffused light is being reflected by the inner surface of a light-transmission medium 43d. The optical signal is split and transmitted to two optical fibers 45d and 46d through the light output portion 42d. With provision of the light diffusion portion 48d, the optical signal transmitted to the two optical fibers 45d and 46d is improved in uniformity.

An optical splitter 50a shown in FIG. 5A includes a light-transmission medium 54a having an light incident portion 51a provided at one end, a light reflection portion (or reflecting/diffusion portion) 52a provided at the other end, and a light output portion 53a provided at the same end as of the light incident portion 51a. In the light-transmission medium 54a, an optical signal is incident on the light incident portion 51a, is reflected (reflected/diffused) by the light reflection portion 52a, is transmitted with spreading over the light output portion 53a, and is output from almost the whole part of the light output portion 53a. The optical signal is incident on the light incident portion 51a through an optical fiber 55a or directly from a light emitting element or optical amplifier of the optical distributor. The incident optical signal is transmitted through the light-transmission medium 54a, is reflected/diffused by the light reflection portion (or reflecting/diffusion portion) 52a at the other end, and is transmitted toward the light output portion 53a. The optical signal is split and transmitted to two optical fibers 56a and 57a via the light output portion 53a.

An optical splitter 50b shown in FIG. 5B includes a light-transmission medium 55b, which has a light incident portion 51b formed at one of a plurality of stepped portions provided at one ends, a light reflection portion (or reflecting/diffusion portion) 52b at the other end, and a plurality of light output portions 53b and 54b formed at the plurality of stepped portions. An optical signal is incident on the light incident portion 51b, is reflected (reflected/diffused) by the light reflection portion 52b, and is output from the plural light output portions 53b and 54b. The optical signal is incident on the light incident portion 51b through an optical fiber 56b or directly from a light emitting element or optical amplifier of the optical distributor. The optical signal, which is input to the optical splitter through a 45°-surface of the light incident portion 51b, propagates through the light-transmission medium 55b, is reflected (reflected/diffused) by the light reflection portion (or reflecting/diffusion portion) 52b at the other end, and is transmitted toward the light output portions 53b and 54b. The optical signal is split and transmitted to two optical fibers 57a and 58a through the 45°-surfaces of the light output portions 53b and 54b.

An optical splitter 50c shown in FIG. 5C has substantially the same construction as the optical splitter 40b shown in FIG. 4B except that the number of splitting is four. An optical signal is incident on a light incident portion 51c through an optical fiber 54c or directly from a light emitting element or optical amplifier of the optical distributor. The optical signal incident through the light incident portion 51c is transmitted toward a light output portion 52c provided at the other end, while the optical signal is being reflected by the inner surface of a light-transmission medium 53c. The optical signal is split and transmitted to four optical fibers 55c to 58c through the light output portion 52c.

An optical splitter 50d shown in FIG. 5D has substantially the same construction as the optical splitter 50b shown in FIG. 5B except that the number of splitting is three. An optical signal is incident on a light incident portion 51d through an optical fiber 57d or directly from a light emitting element or optical amplifier of the optical distributor. The incident optical signal incident through a 45°-surface of the light incident portion 51d propagates in the light-transmission medium 56d, is reflected (or reflected/diffused) by a light reflection portion (or reflecting/diffusion portion) 52d at the other end, and is transmitted toward the light output portions 53d to 55d. The optical signal is split and transmitted to three optical fibers 58d to 60d by way of 45°-surfaces of the light output portions 53d to 55d.

Figure 6A:
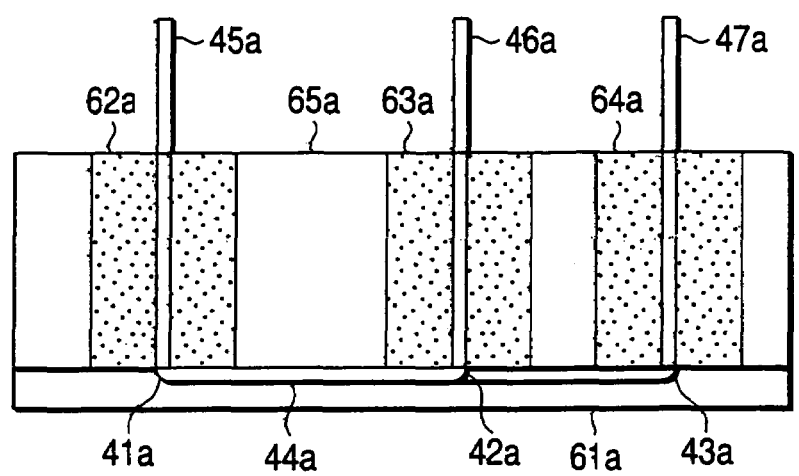
FIGS. 6A and 6B are diagrams showing how to connect an optical splitter to an optical fiber.
Figure 6B:
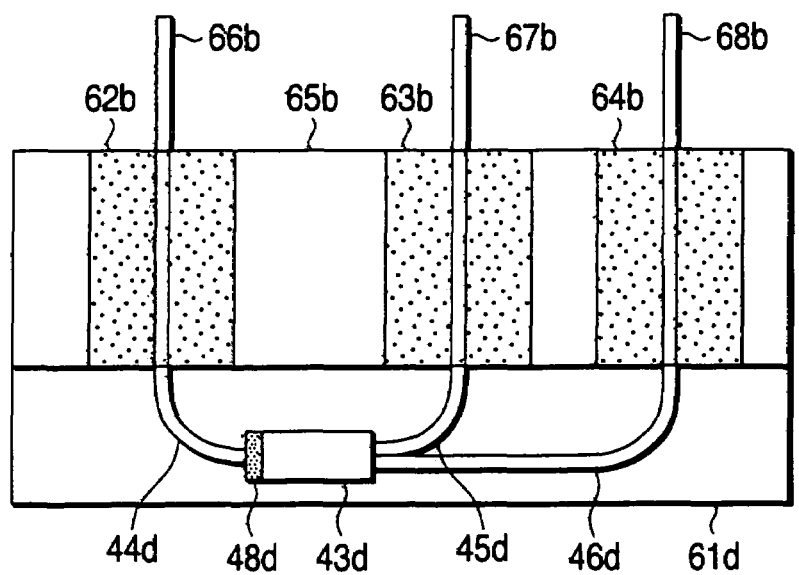

FIGS. 6A and 6B are diagrams showing examples of connecting an optical splitter and an optical fiber.

FIG. 6A shows a case where the optical splitter 40a shown in FIG. 4A is used. In this instance, a medium holding portion 61a holds the light-transmission medium 44a. Fiber connection connectors 62a to 64a are provided parts corresponding to the light incident portion 41a and the light output portions 42a and 43a, respectively. A connector holding portion 65a holds these connectors 52a to 64a. The light incident portion 41a is optically coupled to an optical fiber 45a using the connector 62a, and the light output portions 42a and 43a are optically coupled to optical fibers 46a and 47a using the connectors 63a and 64a, respectively.

FIG. 6B shows a case where the optical splitter 40d having the optical diffusion portion 48d shown in FIG. 4D is used. In this instance, a medium holding portion 61b holds the light-transmission medium 43d. Fiber connection connectors 62b to 64b are provided parts corresponding to the optical fiber 44d for optical signal incidence and the optical fibers 45d and 46d for signal output. A connector holding portion 65b holds these connectors 62b to 64b. The optical fiber 44d for signal incident is optically coupled to an optical fiber 66b using the connector 62b. The optical fibers 45d and 46d for signal output are optically coupled to optical fibers 67b and 68b using the connectors 63b and 64b, respectively.

In FIGS. 6A and 6B, the connector holding portion 65a holds the connectors 62a to 64a, and the connector holding portion 65b holds the connectors 62b to 65b. While in the case of FIG. 6, the connector holding portions integrally hold those connectors, the connectors 62a to 64a or 62b to 64b may be removably inserted to the connector holding portions independently. Alternatively, some of the connectors may be held integrally, while the remaining ones may be removably inserted.

An optical distributing system constructed using the optical splitters will be described.

Figure 7:
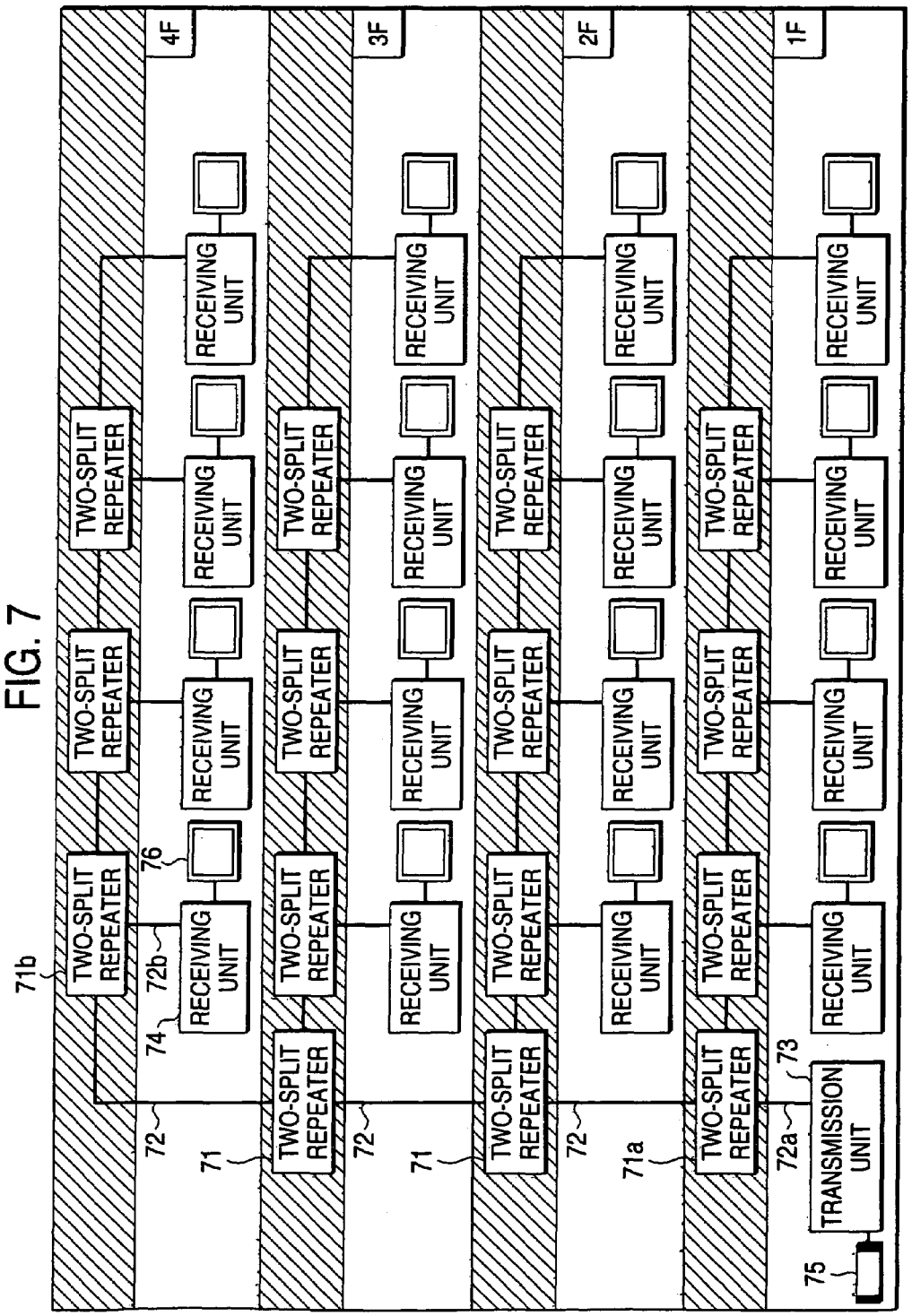
FIG. 7 is a diagram showing an embodiment of an optical distributing system according to the invention.

FIG. 7 is a diagram showing an optical distributing system according to an embodiment of the invention. This embodiment may be applied to a video distribution system used in a building such as a hotel. The video distribution system transmits a signal including vide information from a vide output device to a receiver installed in each room at each floor, using a plurality of optical distributors (hereinafter referred to as "two-split repeater") each having one optical-signal input port and two optical-signal output ports as described above. The transmitted signal contains audio information, control information and other signals in addition to the video information. Specifically, the transmitted signal may be a TMDS (Transmission minimized differential signaling) signal.

The optical distributing system includes a two-split repeater group, a transmission unit 73, and one or a plurality of receiving units 74. The two-split repeater group is a plurality of two-split repeaters 71 mentioned above connected to each other through optical fibers 72. The transmission unit 73 transmits an optical signal through an optical fiber 72a to a two-split repeater 71a located at the most upstream in the two-split repeater group. The receiving units 74 receives the optical signal through an optical fiber 72b from one or more two-split repeaters 71b located downstream of the two-split repeater 71a. The transmission unit 73 is connected to a video output device 75 by electric wires. The receiving units 74 are connected to receivers 76 by electric wires, respectively. In the embodiment, the plurality of two-split repeaters 71, 71a and 71b are disposed, in a branching manner, on each first floor (1F) to 4th floor (4F) of the building. However, the invention is not limited to this example. In a case of planar arrangement, the invention is also applicable.

In the optical distributing system, a signal including video information is distributed to each of receivers in the following way. At first, the transmission unit 73 converts an electric signal output from the video output device 75 into an optical signal. The optical signal is sent through the optical fiber 72a to the two-split repeater 71a in the most upstream. The two-split repeater 71a adjusts (involving amplifying, the same shall apply hereinafter) the input optical signal to an optical signal of a predetermined level, and splits and outputs the adjusted optical signal to two output ports. The two-split repeaters 71 (or 71b) at the next and subsequent stages likewise each adjusts the optical signal to an optical signal of the predetermined level and splits and outputs the adjusted optical signal to the two output ports. Thereby, the adjusted optical signal having the predetermined level is transmitted to the receiving units 74 connected to the output port of the two-split repeater 71b irrespective of installing locations in the building. As a result, one can view normal images on each of the receivers 76 connected to each of receiving units 74.

FIG. 8 is a diagram showing an optical distributing system according to another embodiment of the invention. This embodiment is substantially the same as the embodiment shown in FIG. 7, except that a part of two-split repeater group of the embodiment shown in FIG. 7 is replaced with an optical splitter (hereinafter, referred to as a "hub") having one optical-signal input port and three or more optical-signal output ports.

The optical distributing system includes a plurality of two-split repeater 81, 81a, which are connected in series through optical fibers 82, and a plurality of hubs (HUB) 87 each connected to the two-split repeater 81, 81a. In this embodiment, the hubs 87 are installed on the floors (1F to 4F) of the building, respectively. A transmission unit 83 for transmitting an optical signal through an optical fiber 82a is connected to the two-split repeater 81 in the most upstream of the two-split repeaters connected in series. Each of hubs 87 is connected to receiving units 84 for receiving the optical signal through the optical fiber 82b. A video output device 85 is connected to the transmission unit 83 by electric wires. Receivers 86 are connected to the receiving units 84 by electric wires, respectively.

In the optical distributing system, a signal including video information is distributed to each of receivers in the following way. At first, the transmission unit 83 converts an electric signal output from the video output device 85 into an optical signal. The optical signal is sent through the optical fiber 82a to the two-split repeater 81a in the most upstream. The two-split repeater 81a adjusts (involving amplifying, the same shall apply hereinafter) the input optical signal to an optical signal of a predetermined level, and splits and outputs the adjusted optical signal to two output ports. A hub is connected to one of the output ports of the two-split repeater two-split repeater 81a. The hub adjusts the input optical signal to an optical signal of a predetermined level, and splits and outputs the adjusted optical signal to a plurality of output ports (four output ports in this embodiment). On the other hand, the other output port of the two-split repeater 81a is connected to a two-split repeater 81 at the next stage. As with the above, the two-split repeater 81 at the next stage adjusts the input optical signal to an optical signal of the predetermined level, and splits and outputs the adjusted optical signal to the two output ports thereof. The hub and the two-split repeater 81 at a next stage are connected to each of output ports. Such a connection is repeated in each floor. The adjusted optical signal having the predetermined level is transmitted to the receiving units 84 connected to the receiving units 84 through the optical fiber 82b, irrespective of installing locations in the building. As a result, one can view normal images on each of the receivers 86 connected to the receiving units 84.

The optical distributing system for transmitting an optical signal containing video information has been discussed in the embodiment. However, the invention is not limited to the above optical distributing system. The invention can be applied to another optical distributing system.

As described, the optical distributing system of the invention includes a plurality of optical distributor each having one input and multiple splits, such as a two-split repeater and a hub. Therefore, wiring by the optical fiber is easy and an optical distributing system capable of transmitting an optical signal at high speed can be constructed at low cost. Further, the optical splitter having one input and multiple splits is constructed to be able to adjust an output level. Therefore, the optical distributing system can transmit an optical signal of a sufficiently high level to terminal devices connected to a network, irrespective of the number of distributors, the number of connections or installing location.

The invention may provide an optical distributor, which can adjust an output level, and an optical distributing using the same.

What is claimed is:

1. An optical distributor, comprising:
    at least one optical-signal input port;
    a light receiving device for converting a first optical signal input to the optical-signal input port into an electric signal;
    an electric wiring connected to the light receiving device electrically, wherein the electric signal is transmitted through the electric wiring;
    a light emitting device connected to the electric wiring, the light emitting device for converting the electric signal transmitted through the electric wiring into a second optical signal;
    an optical splitter for splitting the second optical signal into a plurality of third optical signals; and
    a plurality of optical-signal output ports for outputting the third optical signals.

2. The optical distributor according to claim 1, wherein the optical splitter includes a light transmission medium having:
    an incident portion provided at one end thereof; and
    an output portion provided at the other end thereof; and
    wherein an optical signal incident on the incident portion is transmitted with spreading over the output portion.

3. The optical distributor according to claim 2, wherein the light-transmission medium includes a light diffusion portion for diffusing light.

4. The optical distributor according to claim 2, wherein a light diffusion portion for diffusing light is provided at the incident portion of the light-transmission medium.

5. The optical distributor according to claim 1, wherein the optical splitter includes a light-transmission medium having:
    an incident portion provided at one end thereof; and
    a plurality of output portions formed at stepped portions formed at the other ends thereof;
    wherein an optical signal incident on the incident portion is output from the plurality of output portions.

6. The optical distributor according to claim 1, wherein the optical splitter includes a light-transmission medium having:
    an incident portion provided at one end thereof;
    a light reflection portion provided at the other end thereof; and
    an output portion provided at the one end;
    wherein an optical signal incident on the light incident portion is reflected at the light reflection portion and transmitted with spreading over the output portion.

7. The optical distributor according to claim 6, wherein a light diffusion portion, which is provided in the light-transmission medium, diffuses the light incident to the incident portion.

8. The optical distributor according to claim 1, wherein the optical splitter includes a light-transmission medium having:
    an incident portion provided at one end thereof;
    a light reflection/diffusion portion provided at the other end thereof; and
    an output portion provided at the one end;
    wherein an optical signal incident on the light incident portion is reflected and diffused at the light reflection/diffusion portion and transmitted with spreading over the output portion.

9. The optical distributor according to claim 1, wherein the optical splitter includes a light-transmission medium having:
    an incident portion formed at least one of stepped portions having step shapes formed at one end thereof;
    a light reflection portion provided at the other end thereof; and
    output portions formed at the plural stepped portions; and
    wherein an optical signal incident on the incident portion is reflected at the light reflection portion and is output form the output portions.

10. The optical distributor according to claim 9, wherein a light diffusion portion, which is provided in the light-transmission medium, diffuses the light incident to the incident portion.

11. The optical distributor according to claim 1, wherein the optical splitter includes a light-transmission medium having:
    an incident portion formed at least one of stepped portions having step shapes formed at one end thereof;
    a light reflection/diffusion portion provided at the other end thereof; and
    output portions formed at the plural stepped portions; and
    wherein an optical signal incident on the incident portion is reflected and diffused at the light reflection/diffusion portion and is output form the output portions.

12. The optical distributor according to claim 1, wherein at least one of the optical-signal input port and the optical-signal output ports includes a connector for optical fiber connection.

13. An optical distributing system comprises:
    an optical distributing group in which a plurality of optical distributors are connected in series;
    a transmission unit for transmitting an optical signal to the optical distributor located at the most upstream in the optical distributor group; and
    at least one receiving unit for receiving the optical signal from at least one of the optical distributors, respectively,
    wherein each of the plurality of optical distributors comprises the optical distributor according to claim 1 includes:
        at least one optical-signal input port;
        a light receiving device for converting a first optical signal input to the optical-signal input port into an electric signal;
        a light emitting device for converting the electric signal into a second optical signal;
        an optical splitter for splitting the second optical signal into a plurality of third optical signals; and
        a plurality of optical-signal output ports for outputting the third optical signals.

14. The optical distributing system according to claim 13, wherein the optical-signal output ports are two optical-signal output ports.

15. The optical distributing system according to claim 13, wherein the optical distributors are:
    a plurality of first optical distributors each having one optical-signal input port and two optical-signal output ports; and
    at least one second optical splitter having one optical-signal input port and at least three optical-signal output ports; and
    wherein the receiving unit receives the optical signal from the second optical splitter.

16. The optical distributing system according to claim 13, wherein the optical signal transmitted from the transmission unit includes video information.

* * * * *